United States Patent [19]

Vaughn

[11] Patent Number: 4,908,746
[45] Date of Patent: Mar. 13, 1990

[54] INDUSTRIAL CONTROL SYSTEM

[75] Inventor: Mitchell D. Vaughn, Garland, Tex.

[73] Assignee: United States Data Corporation, Richardson, Tex.

[21] Appl. No.: 919,060

[22] Filed: Oct. 15, 1986

[51] Int. Cl.⁴ .............................................. G05B 17/02
[52] U.S. Cl. ................................. 364/147; 364/921.4; 364/974
[58] Field of Search ................ 364/200, 900, 140, 147

[56] References Cited

U.S. PATENT DOCUMENTS

| | | | |
|---|---|---|---|
| 4,019,175 | 4/1977 | Nakao et al. | 364/900 |
| 4,149,235 | 4/1979 | Froyd et al. | 364/900 |
| 4,162,536 | 6/1979 | Morley | 364/200 |
| 4,274,138 | 6/1986 | Shimokana | 364/200 |
| 4,307,447 | 12/1981 | Provanzano et al. | 364/200 |
| 4,722,043 | 1/1988 | Nagamine et al. | 364/200 |

Primary Examiner—Thomas M. Heckler
Assistant Examiner—John G. Mills
Attorney, Agent, or Firm—Baker, Mills & Glast

[57] ABSTRACT

A control system (10) controls transfer of electronic signals to and from industrial and scientific equipment. The control system includes a real-time database (60) for storing data elements which may be accessed by a plurality of tasks (62, 64, 66, 68, 70, and 72). Each data element in the real-time database (60) has an associated changed status flag for each task which indicates whether the value of the element has changed since the last access by the task. Individual tasks must communicate through the real-time database, since no inter-task communication is supported. The tasks support bidirectional communication with industrial and scientific equipment, alarm supervision, data logging, real-time clock functions, mathematical and logical functions, and interactive operator communications.

16 Claims, 8 Drawing Sheets

| ALARM SUPERVISOR CONTROL INFORMATION | | | | |
|---|---|---|---|---|
| ARCHIVE NAME: (C:\ALARM\LOG) ~76 | | | | |
| | 85 T | DEF TAG 78 | DESCRIPTION | 80 |
| ALARM BANNER LINE | M | ALARMSUM | ALARM SUMMARY LISTING | |
| | T | REF TAG 82 | DESCRIPTION | 84 |
| SYSTEM START/UP FLAG | D | STARTUP | MASK ERRORS UNTIL SET | |

| ALARM SUPERVISOR ATTRIBUTES CONFIGURATION TABLE | | | | | | | | | | | | |
|---|---|---|---|---|---|---|---|---|---|---|---|---|
| GROUP | INITIAL COLOR | | | ACTION | | ACKNOWLEDGE COLOR | | | NORMAL UNACK COLOR | | | HISTORY |
| NAME | FG | BG | BL | ACK | AUD | FG | BG | BL | FG | BG | BL | PRT | DSK |
| CRITICAL | RED | BLK | YES | YES | YES | GRN | BLK | NO | BLK | YEL | NO | YES | |
| LOWLEVEL | BLUE | BLK | YES | NO | NO | | | | | | | YES | NO |

88 — CRITICAL
90 — LOWLEVEL

| ALARM SUPERVISOR LINKAGE CONFIGURATION TABLE | | | | | | | | |
|---|---|---|---|---|---|---|---|---|
| T | ALARM REF TAG | STAT | GROUP | PR | MESSAGE | T | VALUE REF TAG | MSK |
| D | TEMPHI | ON | CRITICAL | 1 | TEMPERATURE TOO HIGH | A | TEMP | YES |
| D | TEMPLO | ON | LOWLEVEL | 2 | TEMPERATURE TOO LOW | A | TEMP | YES |
| D | LEVELHI | ON | CRITICAL | 1 | LEVEL TOO HIGH | A | LEVEL | YES |
| D | LEVELLO | ON | LOWLEVEL | 2 | LEVEL TOO LOW | A | LEVEL | YES |
| D | FLOWFAIL | OFF | CRITICAL | 1 | VALVE STUCK | | | NO |
| D | HEATFAIL | OFF | CRITICAL | 1 | HEATER BROKEN | | | NO |

| 12:52:04 | ALARM SUMMARY | TUE 01/05/1985 |

ALARMS = 2

```
>>                    *****START OF ALARMS*****
  01:28:34 TANK3FUL   TANK #3 LEVEL TOO HIGH
  01:29:02 HITEMP3    TANK #3 TEMPERATURE TOO HIGH
  01:36:01 WARNING1   TANK #1 HIGH PRESSURE OR OVERFLOW
                      *****END OF ALARMS*****
```

| F1    | F2 | F3   | F4 | F5     | F6 | F7    | F8    | F9  | F10   |
|-------|----|------|----|--------|----|-------|-------|-----|-------|
| GROUP |    | SORT |    | BANNER |    | PRINT | PURGE | ACK | CLEAR |

*FIG. 3d*

MATH AND LOGIC UNIT CONFIGURATION TABLE

| T | DEF TAG | G | FORMULA | DESCRIPTION |
|---|---------|---|---------|-------------|
| A | TEMP    | 1 | (TEMPF - 32) * 5/9 | F TO C |
| D | TEMPHI  | 1 | TEMP > 55 | SET HIGH TEMP ALARM |
| D | TEMPLO  | 1 | TEMP < 50 | SET LOW TEMP ALARM |
| D | LEVELHI | 1 | IF LEVEL > 100 | |
| D | LEVELLO | 1 | IF LEVEL < 90 | |
| D | FLOW    | 1 | LEVEL < LEVELSET | FLOW VALVE ON/OFF |
| D | HEAT    | 1 | TEMP < TEMPSET | HEATER ON/OFF |
| D | STARTUP | 2 | NOT (FLOW OR HEAT) OR MIN 20 | 20 MIN OR HEAT/FLOW OFF |

Column markers: 136, 138, 140, 142, 144

Row markers: 146a–146h

```
          DATA HANDLER CONTROL INFORMATION

LOG NUMBER (1,2,3,4,5): (1)  ~152
LOG NAME: (C:\ACCURACY\LOG) ~154
ARCHIVE NAME: (A:\ACCURACY) ~156
REPORT FORM: (STD 80) ~158
```

| TRIGGER  | T | REF TAG      | DESCRIPTION                |
|----------|---|--------------|----------------------------|
| START    | D | ~160         | ~162                       |
| INTERVAL | D | MIN1 ~164    | EVERY MINUTE ~166          |
| STOP     | D | MIN5 ~168    | EVERY 5 MINUTES ~170       |

| DATA HANDLER CONFIGURATION TABLE | | |
|---|---|---|
| T | REF TAG | DESCRIPTION |
| A | TEMPSET | TEMPERATURE SETTING |
| A | TEMP | ACTUAL TEMPERATURE |
| A | LEVELSET | LEVEL SETTING |
| A | LEVEL | ACTUAL LEVEL |

176a → A TEMPSET
176b → A TEMP
176c → A LEVELSET
176d → A LEVEL

| EVENT TIMER CONFIGURATION TABLE * | | | | | | | |
|---|---|---|---|---|---|---|---|
| T | DEF TAG | MN | DD | DW | HH | MM | SS | DESCRIPTION |
| D | STARTDAY | | | | 8 | | | EVERYDAY AT 8:00 AM |
| D | STOPDAY | | | | 17 | | | EVERYDAY AT 5:00 PM |
| D | FRI5PM | | | | 17 | | | FRIDAY AT 5 PM |
| D | XMAS | DEC | 25 | RI | | | | CHRISTMAS |

| INTERVAL TIMER CONFIGURATION TABLE * | | | | | |
|---|---|---|---|---|---|
| T | DEF TAG | HH | MM | SS | DESCRIPTION |
| D | SEC5 | | | 5 | EVERY 5 SECONDS |
| D | MIN1 | | 1 | | EVERY 1 MINUTE |
| D | MIN5 | | 5 | | EVERY 5 MINUTES |
| D | MIN20 | | 20 | | EVERY 20 MINUTES |

| PLC POLLED READ CONTROL INFORMATION |||||
|---|---|---|---|---|
| POLLED READ NUMBER : (1) ←204 |||||
| TRIGGER | T | REF TAG | DESCRIPTION ||
| INTERVAL | D | SEC5<br>↑<br>206 | EVERY 5 SECONDS ||

| PLC POLLED READ CONFIGURATION TABLE |||||
|---|---|---|---|---|
| T | DEF TAG | UNIT | ADRS | DESCRIPTION |
| A | TEMPF | 15 | 115 | ACTUAL TEMPERATURE IN FAHRENHEIT |
| A | LEVEL | 15 | 116 | ACTUAL LEVEL |
| D | HEATFAIL | 15 | 121 | HEATER FAILURE |
| D | FLOWFAIL | 15 | 122 | VALVE FAILURE |
|   | ↑<br>210 | ↑<br>212 | ↑<br>214 |   |

215a → row 1 (A TEMPF)
215b → row 2 (A LEVEL)

| PLC WRITE CONFIGURATION TABLE |||||
|---|---|---|---|---|
| T | REF TAG | UNIT | ADRS | DESCRIPTION |
| D | FLOW | 15 | 114 | TURN ON OR OFF FLOW |
| D | HEAT | 15 | 114 | TURN ON OR OFF HEATER |
|   | ↑<br>218 | ↑<br>220 | ↑<br>222 |   |

224a → row 1 (D FLOW)
224b → row 2 (D HEAT)

*FIG. 7c*

INDUSTRIAL CONTROL SYSTEM

TECHNICAL FIELD OF THE INVENTION

This invention pertains in general to industrial control systems, and more particularly, to a industrial control system using a high speed electronic database.

BACKGROUND OF THE INVENTION

Industrial control systems allow an operator to control and monitor the operation of industrial equipment and scientific devices. Such devices may include programmable logic controllers (PLCs), robotic systems, numeric control machines, automatic test systems, scientific analyzers, process controllers, and material handling machines. Previously developed control systems have suffered from several major defects, including the inability to process information quickly enough to meet system demands, and the lack of flexibility to work with varied applications.

The required speed of a control system is dependent upon the amount of data which must be processed by the control system, the complexity of the calculations which must be performed on the data, and the time in which the control system must respond to changing conditions. In order to increase the speed of their systems, control system manufacturers have increased their complexity, resulting in a two- or three-fold increase in speed. However, this increase has been insufficient to keep pace with increased demands. Furthermore, the increase in complexity has resulted in a decrease in flexibility.

Industrial applications vary widely and often change. Hence, industrial control systems must be able to permit future additions and changes. In an attempt to increase the flexibility of their systems, control system manufacturers have attempted to design their systems to fit the most popular applications, and permit some variance for the user to customize the system to meet a specific application's demands. This approach falls short in satisfying the widely varying requirements in industry and results in systems which do not completely meet a user's requirements.

From the foregoing, it can be seen that a need has arisen for an industrial control system having fast response capabilities and flexibility.

SUMMARY OF THE INVENTION

In accordance with the present invention, a control system apparatus is provided which substantially eliminates or prevents the disadvantages and problems associated with prior art control systems.

In accordance with another aspect of the invention, a control system for controlling and monitoring electronically controlled equipment includes a plurality of program tasks which interact with a database memory. The database memory comprises a plurality of memory elements, each of which may be read by the program tasks. A database manager controls transfer of data between the program tasks and the database memory and is operable to transfer only those elements which have changed since the previous transfer.

In accordance with a further aspect of the invention, the database memory consists of elements having a data value portion and a changed status portion. The changed status portion comprises a plurality of status bits, one of which is associated with each program task. A status bit is set when a different value is written into the data value portion of the element, and a status bit is cleared when the value portion is transferred to the program task associated with the status bit.

In accordance with yet another aspect of the invention, the database memory comprises a plurality of data blocks, each data block corresponding to a specific data type. An index number corresponding to a predetermined element of the database is assigned to data used by the program tasks to speed data transfers between the program tasks and the database memory.

BRIEF DESCRIPTION OF THE DRAWINGS

For a more complete understanding of the present invention and the advantages thereof, reference is now made to the following description taken in conjunction with the accompanying Drawings in which:

FIGS. 3a-c illustrate configuration tables used to configure the alarm supervisor task of the control system for a specific application;

FIG. 3d illustrates an alarm summary screen;

FIG. 4 illustrates the configuration table used to configure the math and logic function task for a specific application;

FIGS. 5a-b illustrate configuration tables used to configure the data handler task for a specific application;

FIGS. 6a-b illustrate configuration tables used to configure the real-time clock function task for a specific application;

FIGS. 7a-c illustrate configuration tables used to configure the communications task for a specific application;

FIG. 8a illustrates a graphic display produced by the operator input/output task;

FIGS. 8b-c illustrate configuration tables used to configure the communications task for a specific application;

DETAILED DESCRIPTION OF THE INVENTION

Figure 1:
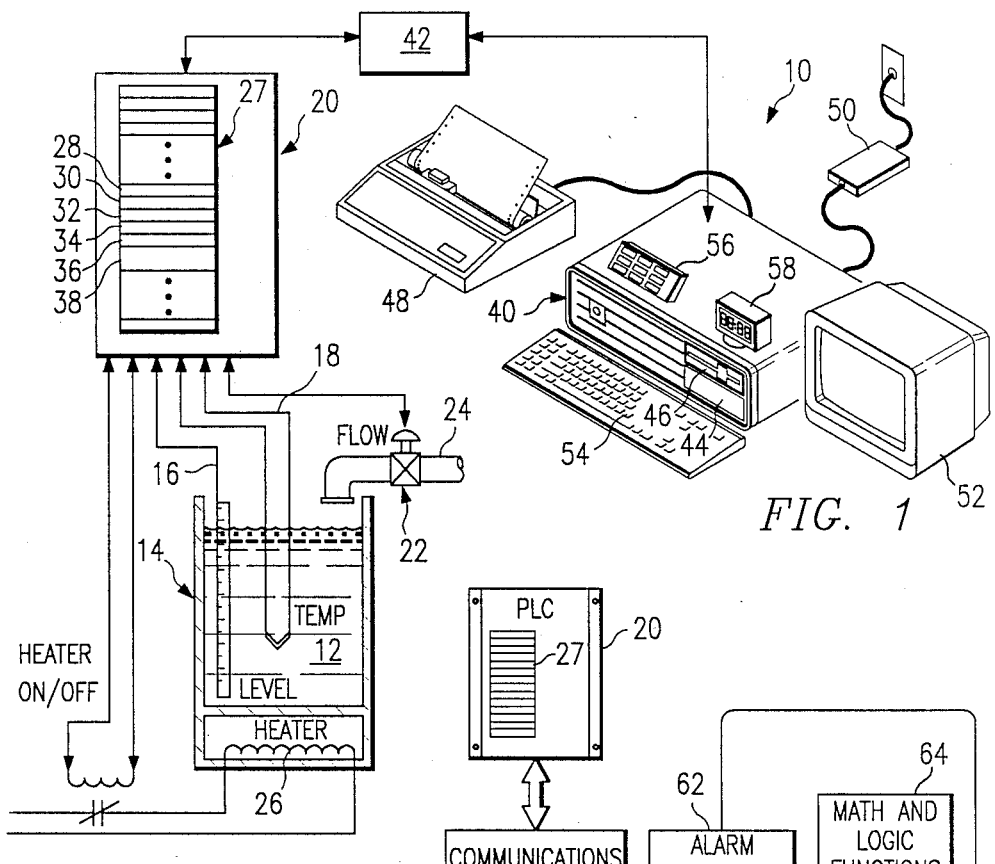
FIG. 1 illustrates a control system used to control the level and temperature of a liquid contained in a vessel.

The preferred embodiment of the present invention is best understood by referring to FIG. 1 of the Drawings, like numerals being used for like and corresponding parts of the various Drawings. FIG. 1 illustrates an apparatus used for controlling and monitoring scientific and industrial machinery. In the illustrated embodiment, the invention is shown in conjunction with an application involving maintenance of a relatively constant level and temperature of a liquid contained in a vessel. It will of course be understood that the described embodiment is only exemplary and that the present concept can be used with other control and monitoring environments.

As illustrated in FIG. 1, a control system 10 monitors a liquid 12 contained in a vessel 14. A fluid level meter 16 and a fluid temperature meter 18 are utilized to measure the level and temperature of the water in the vessel 14. The outputs of the water level meter 16 and the water temperature meter 18 are connected to a programmable logic controller (PLC) 20. A valve 22, operably connected to the PLC 20, restricts and enables flow of the liquid 12 into the vessel 14 through a pipe 24. A heater 26 is utilized to heat the temperature of the liquid 12 in the vessel 14. The heater is likewise connected to the PLC 20.

The PLC 20 has an internal memory 27 which may be accessed by other devices. In the illustrated embodiment, four of the memory locations are used to store outputs from the fluid level meter 16 and the temperature meter 18; namely, a temperature output location 28, a fluid level output location 30 a valve failure output location 32, and a heater failure output location 34. Two memory locations are used to store control signals for input to the valve 22 and heater 26; namely, the flow on/off input location 36 and a heater on/off input location 38. The PLC 20 is connected to a Control Processing Unit (CPU) 40 by a communications processor 42, which may access the PLC memory 27. The CPU 40 also interfaces with a hard disk 44, a floppy disk 46, a printer 48, a modem 50, a color display monitor 52 and a keyboard 54. A large semiconductor RAM memory 56 and a real-time clock 58 are included in the CPU 40.

In the illustrated example, the control system 10 is used to maintain a relatively constant level and temperature of a liquid 12 contained in a vessel 14. The level of the liquid can be varied by enabling or inhibiting liquid flow through pipe 24 by opening or closing valve 22. The valve 22 may be opened or closed by transmission of a proper control signal to the flow on/off input location 36 of the PLC 20. In this illustration, it is assumed that a control signal of value "1" opens the valve 22 to permit flow therethrough and a control signal of value "0" closes the valve 22. Similarly, the temperature of the liquid 12 may be varied by turning the heater 26 on or off via a proper control signal to the heater on/off input location 38. It will be further assumed that a control signal of value "1" will turn the heater 26 on, while a control signal of value "0" will turn the heater 26 off.

Furthermore, it is presumed that the valve and heater are designed to output a control signal to the PLC 20 in the event that a failure occurs in their respective operations. The failure outputs are sent to memory locations within the PLC 20, namely, the valve failure output location 32 and the heater failure output location 34.

It is assumed, but not required, that the fluid level meter 16 and fluid temperature meter 18 output their respective measurements of the fluid level and temperature in standard units; for simplicity of illustration, the water level meter 16 is assumed to output its measurement in inches and the water temperature meter 18 is assumed to output its measurement in degrees Fahrenheit. The output of the fluid level meter 16 and the fluid temperature meter 18 are stored in their respective memory locations in the PLC 20; namely, the temperature output location 28 and fluid level output location 20.

PLC 20 is a typical programmable logic controller used in industry. A PLC is a conventional digital data processor or computer having multiple input and output capabilities through memory locations 27. Generally, PLCs have memory configurations ranging in the thousands of bytes of memory. Each memory location can be connected to an input; for example, an input to the PLC 20 could be connected to the output of the fluid level meter 16. The memory within the PLC can be accessed for reading in either of two ways. First, a single memory location can be read by supplying the address of the location along with proper control signals. Second, a block of memory can be read by supplying the addresses of the starting and ending memory locations, along with appropriate control signals for a block-read. In response to a block-read command, the PLC outputs the values stored in the contiguous memory location defined by the starting and ending addresses. Furthermore, PLCs can be "networked", in order to allow a device to read the memory of multiple PLCs through a single port. To read data from a network of PLCs, both a "unit" address (indicating the particular PLC in the network) and a memory address (either a single address or a two-block address) must be specified by the reading device along with proper control signals. Generally, PLCs from different manufacturers cannot be networked, due to different protocols used in the networking schemes.

In one embodiment, the multi-tasking CPU 40 comprises an IBM XT or IBM AT computer ("XT" and "AT" are trademarks of the IBM Corporation), or another brand of computer compatible therewith. In many instances, an industrial version computer, such as the IBM 7532 computer, will be necessary in order prevent deterioration of the computer components due to a hostile operating environment. Preferably, the multi-tasking CPU is supplied with at least 640K of semiconductor RAM memory. Optionally, a color-graphics card is included to allow high resolution color imaging by color display monitor 52. The IBM XT and AT type computers can be made multi-tasking through use of the IBM "Topview" ("Topview" is a trademark of the IBM Corporation) program or other similar programs. The "Topview" program allows several applications programs to run simultaneously.

The communication processor 42 enables the multi-tasking CPU 40 to communicate with a multiplicity of components such as PLCs, process controllers, robotic systems, and numeral control machines. Although a communication processor is optional, since the CPU 40 can communicate with the equipment using standard parallel and RS-232 I/O ports, the use of a communication processor 42 can dramatically increase the efficiency of the control system 10. The communication processor 42, which uses its own microprocessor, streamlines operation of the CPU 40 by performing operations such as data conversion (translating between communication protocols), error checking and block data transfers which would otherwise require processing by the CPU 40. Thus, the addition of a communication processor 42 can speed communication between the PLC 20 and the CPU 40, while freeing the CPU 40 from extra processing.

The basic operation of the control system 10, which will be subsequently described in detail in connection with FIGS. 2-9, is as follows. In the illustrated example, the purpose of the control system 10 is to maintain predetermined levels and temperature of a liquid 12 in a vessel 14. The actual level and temperature of the liquid is monitored by the fluid level meter 16 and temperature meter 18, the outputs of which are stored in predetermined locations in the PLC memory 27. The CPU 40 regularly updates its information on the actual level and temperature of the liquid 12, by transferring data stored in the temperature output location 28 and the fluid level output location 30. A number of tasks, running simultaneously in the multi-tasking environment, monitor changes in the actual level and temperature of the liquid 12, and act thereupon. For example, a first task may compare actual temperature and levels of the fluid 12 with a predetermined temperature and a predetermined level in order to determine whether the heater 26 should be turned on or off, and whether the valve 22 should be opened or closed. A second task may update a color-graphics display, adjusting the temperature and level indicators upon changes in the actual level and temperature of the liquid 12. A third task may set off an "alarm" if the temperature or level of the liquid 12 exceeds a predetermined limit. A fourth task may monitor the actual temperature and level at set intervals in order to create a log of data values for later analysis.

It should be noted that the illustrated example describes only one of many applications for which the control system 10 could be used to monitor and control scientific and industrial equipment. As will be understood by those skilled in the art, the control system described herein may be easily modified for various applications.

An operator (one who operates the system during run-time) inputs desired values for the level and temperature of the liquid 12. Through the PLC 20, the CPU 40 monitors the output of the level meter 16 and the temperature meter 18. Memory locations in the PLC 20, specifically, the temperature output location 28, the level output location 30, the flow failure output location 32 and the heater failure output location 34, are "block-read" to the RAM memory 56 of the CPU 40 via the communication processor 42 at regular preselected intervals. Similarly, data from the RAM memory 56 at the CPU 40 is written to the flow on/off input 36 and the heater on/off input 38 of the PLC 20 when relevant data elements change in value. As will be described in more detail in conjunction with FIGS. 2 and 9, data elements used in the control system 10 have set locations within a section of the RAM memory 56.

Each element stored in the RAM memory has associated "changed status" flags, each element having changed status flags corresponding to each of the tasks operating in the multi-tasking environment. The changed status flags are set when the associated data element changes in value and are cleared when the value of the element is read by the associated task. The various tasks, running simultaneously under the multi-tasking environment, poll the changed status flags in order to determine whether data used by the task has changed. If so, the tasks receive the new data and perform their function. For instance, in the illustrated embodiment, one task may monitor the RAM memory location associated with the actual level of the liquid 12. If the actual level changes, the task reads the new value and compares it with predetermined levels. If the actual level differs from the predetermined level, then the task writes a data value into second memory location in the RAM memory 56 which is referenced by a second task. The second task may send control signals to the PLC 20 in order to open or close valve 22.

Figure 2:
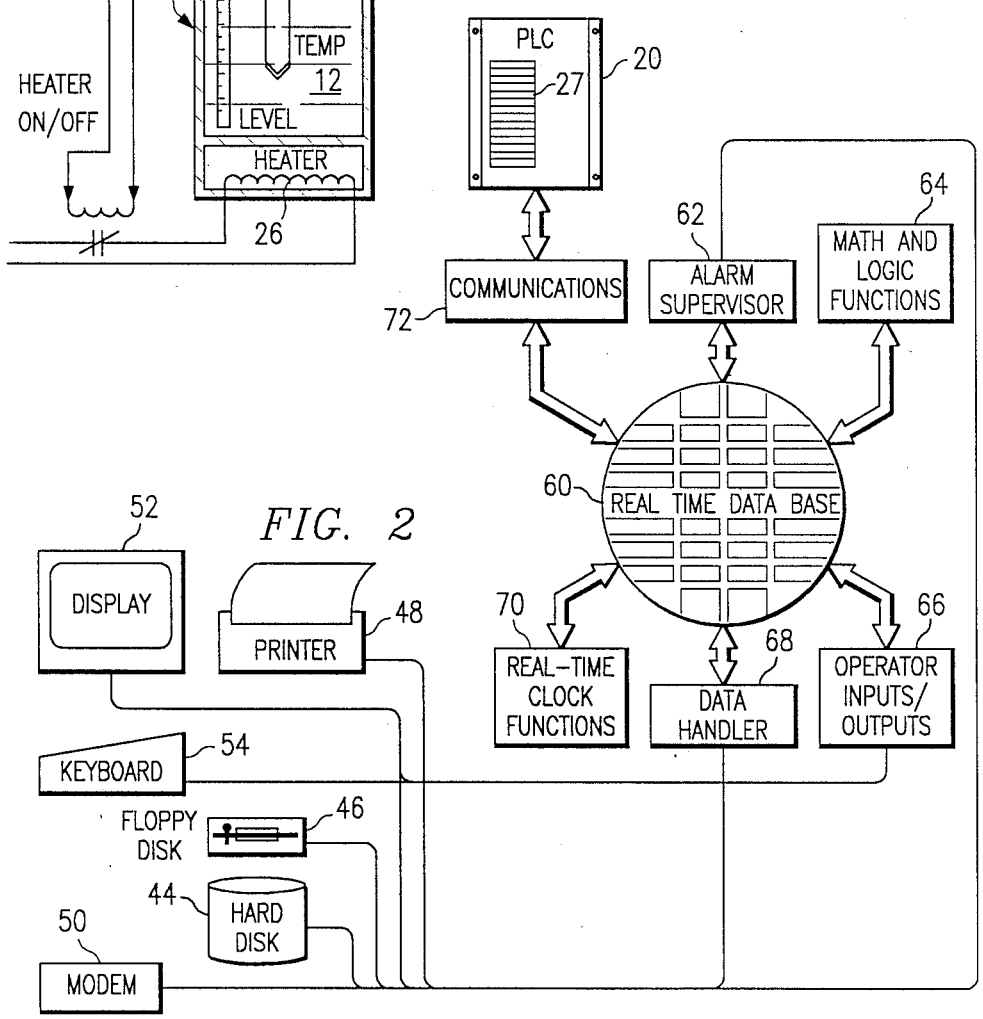
FIG. 2 illustrates a functional representation of the control system.

FIG. 2 illustrates the functional implementation of the invention. A real-time data base 60 communicates with six tasks: an alarm supervisor task 62, a math and logic function task 64, an operator input/output task 66, a data manager task 68, a real-time clock function task 70, and a communications task 72. The communications task 72 provides bidirectional communications with outside devices, in this case the PLC 20, through the communications processor 42. The alarm supervisor task 62 and the data manager and file storage task 68 provide outputs to the color-display monitor 52, the modem 50, the printer 48, floppy disk 46, and the hard disk 44. The operator input/output task 66 provides interactive communication with system operator through the keyboard 54 and the color-display monitor 52.

The heart of the control system 10 is the real-time database 60. The real-time database 60 is contained within the RAM memory 56 of the CPU 40. The real-time database stores elements used by the tasks 62–72. Each element comprises a data value and changed status bits. In the preferred embodiment, the real-time date base 60 supports four data types: "digital" (either a "1" or a "0" data value), "analog" (a 16-bit integer value), "floating point" and "message" (an ASCII text string). Each data type is stored in a separate section of the real-time database 60.

Each of the tasks 62–72 can "define" and/or "reference" elements in the real-time database 60. When an element is "defined," it is assigned an index name and an index number which correspond to memory locations in the real-time database 60. Only the task which defines the element can write to the memory locations in the real-time database 60 in which the element is stored.

However, any number of tasks may "reference" a previously defined element. Each task 62–72 is assigned a "changed status" bit for each element in the real-time database 60. The changed status bit indicates whether the value of the associated element has changed since the element was last referenced by the task. When the task references the real-time database 60, the value of a particular element is transferred to the task if the changed status bit associated with the element is set. To illustrate, assume that the math and logic function task 64 defines an element "heat" which has a value of "1" when the actual temperature of the liquid 12, stored in element "temp", is less than a predetermined desired temperature, stored in element "tempset". "Temp" and "tempset" are elements of the real-time database 60 defined by other tasks. In order to determine the value of "heat", the math and logic functions task 64 continuously polls the changed status bits associated with the "temp" and "tempset" elements in the real-time database 60 to monitor changes in the value of the two elements. If, for instance, the changed status bit associated with "temp" is set, the real-time database 60 transfers the value of "temp" to the local memory of the math and logic functions task 64, which compares to the previous value of "tempset" (assuming "tempset" has not also changed) and determines whether the value of "heat" has changed. If so, the math and logic function task 64 transfers the new value into the memory locations in the real-time database 60 associated with the "heat" element. Upon transfer of a new value for "heat", the changed status bit associated with "heat" are set, and tasks referencing "heat" would recognize that the value has changed.

A key aspect of the control system 10 is that data values are never passed directly between tasks; rather, data values pass through the real-time database 60. As illustrated in the previous example, the calculations performed by the tasks need only be made when a pertinent referenced element has changed; using the above example, "heat" need be recalculated only when one of the constituent elements, "temp" or "tempset", has changed. This feature greatly reduces needless processing time spent performing on redundant calculations.

The alarm supervisor task 62 monitors alarm conditions throughout the control system 10. In the illustrated embodiment of FIG. 1, the alarm supervisor task 62 might be used to monitor six conditions: (1) whether the temperature has exceeded a maximum level, (2) whether the temperature has decreased below a minimum level, (3) whether the level of liquid 12 has exceeded a maximum level, (4) whether the level of the liquid 12 has decreased below a minimum level, (5) whether the valve 22 has failed, and (6) whether the heater 26 has failed. The primary purpose of the alarm supervisor task 62 is to maintain a alarm summary screen which presents alarm information to the operator.

Alarms are initiated by data elements in the real-time database 60. An alarm may be issued in response to a "true" state (value="1"), "false" state (value="0"), or a "toggle" state (value changes from "1" to "0", or from "0" to "1") of a particular element. The system operator may "acknowledge" an alarm by pressing a key, indicating that he has taken note of the alarm. An alarm may be in one of four possible states: "new", "acknowledged", "fixed", or "fixed but unacknowledged". An alarm is "fixed" when the conditions initiating the alarm have returned to "normal".

A list of alarms is maintained on the alarm summary screen. A particular alarm remains on the list until it is "fixed"; if desired, an alarm remains on the screen until it is both "fixed" and "acknowledged".

Normally, the alarm summary screen would be displayed in background, while a graphics display of the system, in this case, a display of the tank and liquid, is displayed in the foreground. The operator may switch from the foreground display to the background display by pressing a function key on the keyboard 54. Generally, a field in the graphics-display informs the operator of a new alarm; upon notification, he may switch screens to view the alarm summary. Also, a historical log of the alarms is saved on a permanent memory device, such as the floppy disk 46 or the hard disk 44. It may also be desirable to maintain a printed list of the alarms on the printer 48 or on a remote printer through use of the modem 50.

Several features of the alarm supervisor 62 serve to provide a more effective and organized alarm summary screen. Alarms may be grouped by function, with distinct colors associated with alarms and messages of a certain group as displayed on the alarm summary screen The colors associated with a group may change depending upon whether the operator has "acknowledged" the alarm. Another color combination may indicate that an alarm is in a "fixed but not acknowledged" state. Also, whether an alarm is either printed or stored may be decided on a group basis. Grouping alarms may be done on either a functional basis or by priority. For instance, in the illustrated example of FIG. 1, alarms could be grouped as "temperature alarms", "level alarms", and "equipment failure alarms". Alternatively, the alarms could be grouped by priority, for instance, "critical alarms" and "low level alarms".

Alarms may be prioritized, even within groups, so that the most important alarms are listed at the top of the alarm summary screen. Alternatively, the alarms can be listed historically, i.e., in the order in which they occur.

In certain instances, it will be desirable to ignore alarms during the start-up of the system. The alarm supervisor 62 can be configured to mask specific alarms during start-up, so that the alarm summary screen will not be cluttered with unnecessary alarms. An element in the real-time database 60 is used by the alarm supervisor task 62 to determine the end of the start-up period. This element may be a function of time or dependent on other elements in the real-time database.

The operation of the alarm supervisor 62 is best understood with reference to FIGS. 3a–d. FIGS. 3a–c illustrate configuration tables used to customize a task for a particular application.

Configuration tables, such as those illustrated in FIG. 3a–c, allow a user (system programmer) to program the operation of a task to meet the particular requirements of his application. The configuration tables are programmed while the control system 10 is off-line. To program a configuration table, the user enters data in the fields of the configuration table. Entry of data in the fields is interactive; the entries are checked for validity in order to reduce run-time errors. For instance, a element cannot be referenced by a task before it has been defined; thus, entry of an undefined element in a "REF TAG" field would generate an error.

The Alarm Supervisor Control Information Table 74 is illustrated in FIG. 3a. The Alarm Supervisor Control Information Table 74 has an archive name field 76, a banner line field 78, a banner description field 80, a system start-up flag field 82, and a start-up description field 84. The archive name field 76 allows the user to define a storage device and file name for the alarm history log. In this instance, the user has defined the active device as the "C" device; normally, this refers to the hard disk drive. The file name for the alarm history log is given as "alarm/log". Hence, the alarm history will be written into a file named "alarm/log" on the hard disk drive 44. In the alarm banner line field 78, the user enters the tag name for the element within the real-time database 60 which will contain the alarm message corresponding to the most current alarm. By referencing the element in the real-time database 60 corresponding to this tag name, the other tasks 64–72 may monitor the active alarm currently selected by the operator. In the illustrated embodiment, the alarm banner line tag 78 has been given the name "alarmsum". Thus, for example, the operator input/output task 72 could reference "alarmsum" in order to display the most recent error message on the graphics display screen. The banner description field 80 allows the user to briefly document his work. The system start-up flag field 82 allows entry of the tag name which refers to the element of the real-time database 60 referenced by the alarm supervisor 62 to determine the end system's start-up phase. The choice of the system's start-up flag varies depending upon the application. For example, "startup" could be an element defined by the real-time clock function task as a twenty-minute interval timer element, i.e., "start-up" would correspond to an element in the real-time database 60 which is set after twenty minutes has elapsed. Thus, applicable error messages would be suppressed for the first twenty minutes. Alternatively, "startup" could be an element defined by the math and logic functions task 70 such that "start-up" would be set after the temperature of the fluid reached a predetermined value. As will be shown in conjunction with FIG. 4, for purposes of the illustrated example, "startup" is defined in the math and logic task 70 such that it is set when either the actual temperature and the level exceed preset limits or after twenty minutes has elapsed. The start-up description field 84 allows the user to describe the system start-up flag 82 for later reference.

The "T" field 85 is generally used in the configuration tables to allow the user to specify the data type associated with an element which is being defined in the configuration table (when an element is being referenced, such as "startup", the "T" field is used only for edification since the element's data type is always determined at definition). However, since the alarm banner line tag must always be a "message" data type due to its underlying purpose, it is not necessary to define the data type of the alarm banner line tag in this particular configuration table.

As illustrated in FIG. 3b, the Alarm Supervisor Attributes Configuration Table 86 allows the user to define "alarm groups" in which alarms may be categorized by the user, such that alarms in a common alarm group have common attributes. The group name field 87 allows the users to define a plurality of alarm groups. In this instance, the user has defined two alarm groups: a "critical" alarm group 88 and a "low level" alarm group 90. For each alarm group, attributes common to the group can be set by entering data into thirteen fields namely: the initial foreground color field 92, the initial background color field 94, initial blinking option field 96, a required acknowledgment option field 98, an audible alarm prompt field 100, an acknowledged alarm foreground field 102, an acknowledged alarm background field 104, an acknowledged alarm blinking field 106, a normal unacknowledged foreground color field 108, a normal unacknowledged background field 110, a normal unacknowledged blinking field 112, a history printout field 114, and a history store-to-disk field 116.

The initial color fields 92–96 define the color of the alarm messages on the alarm summary screen. Thus, as shown, the "critical" alarms are displayed as red characters on a black background and the low level alarms are displayed as blue letters on a black background. Both critical and low level alarms blink. The difference in display color in the two alarm groups facilitates tracking of the alarms by the operator.

The acknowledge field 98 determines whether the operator must "acknowledge" an alarm, i.e., whether he must signal to the control system that he has read the alarm message. Alarms which must be acknowledged will remain on the alarm summary until they are acknowledged, whether or not the problem precipitating the alarm has been corrected. If no acknowledgement is necessary, the alarm will remain on the alarm summary only until the problem has been corrected (a "normal" state).

The audible alarm prompt field 100 determines whether a new alarm condition will be accompanied by a audible tone notifying the operator that an alarm condition has occurred. Thus, in the illustrated Alarm Supervisor Attributes Configuration Table 86, "critical" alarm conditions will be accompanied by an audible tone, whereas "low level" alarm conditions will not.

The acknowledged color fields 102–106 determine the color of an alarm which has been acknowledged by the operator, without correction of the underlying problem. In the illustrated embodiment, "critical" alarms will change from red to green and stop blinking once the operator has acknowledged the alarm. "Low level" alarms remain blue, whether or not they are acknowledged, since the acknowledge option was not invoked for the "low level" alarm group.

The normal unacknowledged color fields 108–112 determine the colors of the messages in situations where the problem causing the alarm has returned to a normal condition, but the alarm has not been acknowledged as required. In the case of the "critical" alarms, an unacknowledged alarm in a "normal" (corrected) state is displayed as black characters on a yellow background. Since the "low level" alarms do not need to be acknowledged, they will be removed from the alarm summary once the condition is returned to normal.

The history fields 114–116 determine whether an alarm is either printed or stored to a non-volatile memory device. In the illustrated embodiment, both "critical" and "low level" alarms will be printed on the printer 48. However, only the critical alarms will be stored to the alarm history file defined in archive name field 76 as "alarm/log".

The Alarm Supervisor Linkage Configuration Table 118, illustrated in FIG. 3c, allows the user to determine which conditions will generate an alarm. The Alarm Supervisor Linkage Configuration Table 118 has an alarm reference tag field 120, a alarm status field 122, a group field 124, a priority field 126, a message field 128, a value reference tag 130 and a mask option field 132. The entries in the alarm reference tag field 120 refer to elements in the real-time database 60 as defined by other tasks. The elements used in the alarm reference tag field must be of a digital (binary) data type. In the illustrated embodiment, the user entered six alarm reference tags 134a–f: "temphi", "templo", "levelhi", "levello", "flowfail", and "heatfail". "Temphi", "templo", "levelhi" and "levello" are defined in the mathematical and logic functions tasks 64, and will be described hereinafter. "Flowfail" and "heatfail" are defined by the communications task 72, which will also be described hereinafter.

The status field 22 allows the user to select the condition of the reference tag chosen in the alarm reference tag field 120 which will initiate the alarm. The proper entries in this field are "on", "off", or "togl" ("toggle"). A status of "on" indicates that the alarm is initiated when the alarm reference tag assumes a value of "1". For example, the "temphi" alarm 134 is configured such that the element corresponding to the tag "temphi" in the real-time database 60 has a value of "1". An "off" status indicates that the alarm is generated when the element associated with the alarm reference tag is a "0". A "togl" status indicates that the alarm will be generated when the value associated with the alarm reference tag changes, i.e., when the change status bit associated with the element is set.

The group field 124 determines the group, defined in the Alarm Supervisor Attributes Configuration Table 86, with which each alarm is associated. In the illustrated embodiment, the "temphi", "levelhi", "flowfail", and "heatfail" alarms are "critical" alarms, and the "levello" and "templo" alarms are "low level" alarms.

The priority field 126 allows the user to specify the priority of of the alarm. The alarm messages on the alarm summary may be sorted historically (in the order the alarms occur) or by the designated priority given in the priority field 126, listing alarms by the designated priority group. Multiple alarms within a single priority group are sorted historically.

The message field 128 allows the user to define the message which will be displayed on the alarm summary when the associated alarm occurs. In addition, the value reference tag field 130 allows the user to specify a element in the real-time database 60 which is read and displayed along with the message entered in the message field 128. Thus, in the "temphi" alarm 134, if the alarm occurs when the temperature exceeds 55° C. and the actual temperature is 60° C., the message "temperature too high 60" is displayed on the alarm summary.

The mask field 132 provides for masking of alarms during the start-up period. The start-up period ends when the system start-up flag, defined in the Alarm Supervisor Control Information Table 74 is set.

FIG. 3d, illustrates an alarm summary screen. For case of illustration, colors associated with different alarm groups have been omitted.

Referring now to FIGS. 2 and 4, the math and logic functions task 64 is illustrated in connection with the Math and Logic Unit Configuration Table 135. As shown in FIG. 2, the math and logic function task 64 interacts with the real-time database 60. The math and logic task performs mathematical calculations, logical comparison and other functions on data contained in the real-time database 60. The mathematical operations include the arithmetic operations of addition, subtraction, multiplication and division. The logical comparisons include the NOT, AND, OR, XOR functions. Also, relational operators are supported, such as "<" (less than), "<=" (less than or equal to), ">" (greater than), ">=" (greater than or equal to), and "!=" (not equal to). Furthermore, conditional assignments using IF—THEN—ELSE are supported by the math and logic task 64.

Referring now to FIG. 4, the Math and Logic Unit Configuration Table 135 is shown with sample entries. The Math and Logic Unit Configuration Table 135 contains five fields for user entry: a data type field 136, a tag definition field 138, a group field 140, a formula field 142, and description field 144.

To configure the math and logic task 64, the user first enters a data tag name and data type for an element to be stored in the real-time database 60. Once a tag name has been defined, other tasks may reference the value of that element in the real-time database 60, but no other task may write to that element. The type field 134 specifies the data type of the defined element: digital, floating point, analog, or message.

The group field 140 allows the user to specify groups of elements which are calculated without intervening references to the real-time database 60 to update referenced elements used in the calculations.

The formula field 142 allows the user to define an equation, the result of which will be stored in the element associated with the tag name entered in the defined tag field 138. The operands of the equation may be constants or elements of the real-time database 60. The description field 144 allows the user to describe the equation for future references.

Definition tags 146a–h set forth examples of elements defined in the Math and Logic Unit Configuration Table 134. The first entry, "temp" 146a, translates a Fahrenheit temperature "tempf" into a celsius temperature "temp". "Tempf" is defined by the communications task 72, as will be described hereinafter, and corresponds to the output of the liquid temperature meter 18. Definition tags 146b–e are digital elements, calculated to determine whether the temperature and the level of the fluid are within a predetermined range. As noted in conjunction with FIG. 3, these elements are used to initiate alarms. Definition tags 146f–g, "flow" and "heat", indicate whether the actual level and temperature of the liquid 12 remain above levels set by the operator. These elements are used to turn on the heater 26 and the valve 22, as explained hereinafter in conjunction with the Communications Task 72, and also are used for the graphics display. The last definition tag 146h, "start-up", calculates an end to the start-up period of the system, as previously explained with regard to the alarm supervisor task 72. In the illustrated example, start-up is "true" when either twenty minutes has elapsed ("min20" is defined by the real-time clock function task 72) or when both "flow" and "heat" are both "false", i.e., when both the level and temperature of the liquid 12 has reached or exceeded the operator set values.

Referring now to FIG. 2 in conjunction with FIG. 5, the operation of the data manager task 68 is illustrated. The data handler task 68 operates to print, transmit and store any information contained within the real-time database 60. Stored files, called "logs", can be accessed by other software for analysis and report generation.

The data handler task 68 is configured with the Data Handler Control Information Table 148 and the Data Handler Configuration Table 150. Up to five Data Handler Control Information Tables 148 and associated Data Handler Configuration Tables 150 may be configured to provide five different logs. Each Data Handler Control Information Table 148 has log number field 152, a log name field 154, an archive name field 156, a report form field 158, a starting reference tag field 160, a starting description field 162, an interval reference tag field 164, an interval description field 166, a stopping reference tag field 168 and stopping description field 170. The Data Handler Configuration Table 150 has a data reference tag field 172 and a data description field 174. Logged data tags 176a–d are given as examples of data elements in the Data Handler Configuration Table 150.

The Data Handler Control Information Table 148 allows the user to specify which devices, and which files, are used to log the data. Furthermore, the Data Handler Control Information Table 148 specifies the start and stop conditions (which define a "shift"), and the intervals at which data is scanned.

Up to five active logging processes occurring at the same time are possible in the preferred embodiment. The log number field 152 identifies each particular log process (separate tables are completed for each logging process). The log name field 154 contains the name of the file which holds the most recent log data; at the end of each shift, this file is reset and overwritten by the next shift. In this example, "accuracy" is selected as the name of a log, and "log1" is selected as the extension. The archive name field 156 provides a file for the storage of data from each shift; in the example, the archive name is given as "a:/accuracy" ("a:" denotes the floppy disk drive 46). An extension is added to each archive file after closing the file, such as "accuracy 0.001", "accuracy 0.002", in order to distinguish the archive files. The report form field 158 is used to select either an 80- or a 132- column format when the log is to be output to a printer.

The start field 160, stop field 168 and interval field 164 define the shift during which the log is taken. The reference data element selected by the user in each of these fields refers to an element in the real-time database 60. When the corresponding data element is in a "true" state, the appropriate action will be taken. For example, the interval reference tag 164 is given as "min1"; this refers to a data element defined by the real-time clock function task 70 which provides a "true" value at intervals of one minute. The stop reference tag 168 is given as "min5", which is also defined by the real-time clock function task 70; it has a "true" value at intervals of five minutes. The start reference tag is left blank, indicating that the log will repeat continuously. Thus, the log samples the data specified in the Data Handler Configuration Table 150 at every minute for five minutes. At the end of the five minutes, the log file will be closed, and re-opened immediately, providing the most recent five minutes of data at all times. A new archive file is created every five minutes and data is printed in a report form.

Events used to define the shift do not have to relate to time. For example, a data log could be initiated each time an equipment failure occurs.

After completion of the Data Handler Control Information Table 148, a corresponding Data Handler Configuration Table 150 is completed to specify which data elements within the real-time database 60 are to be scanned during a logging process. The reference tag field 172 specifies the elements which will be included in the reports. In the illustrated embodiment, "tempset" and "levelset" (elements corresponding to the operator's temperature and level settings, as defined by the operator input/output task 66) and "temp" and "level" (the actual values for temperature and level) are specified for the log.

Referring now to FIGS. 2 and 6, the real-time clock function task 70 is illustrated.

The real-time clock function task 70 allows the user to define elements within the real-time database 60 which relate to time, events, and intervals, including annual dates and times, weekly dates and times, daily times, and time intervals. The real-time clock function task 70 uses a hardware interrupt, to prevent delay related to task switching.

The operation of the real-time clock function task 70 is best explained in conjunction with FIGS. 6a–b, which illustrates an Event Timer Configuration Table 177 and a Interval Timer Configuration Table 178. The Event Timer Configuration Table includes a defined tag field 179, a month field 180, a day field 181, a day of the week field 182, a hour of the day field 184, a minute of the hour field 186, and a second of the minute field 188. Sample event tags 190a–d are given for purposes of illustration. The Interval Timer Configuration Table 174 includes a defined tag field 192, an elapsed hour field 194, an elapsed minute field 196, and an elapsed second field 198. Interval tags 200a–d are given as examples.

Referring now to FIG. 6a, the Event Timer Configuration Table 177 allows the user to provide for events which occur at most only once every twenty-four hours. Using the Event Timer Configuration Table 172, the user can specify the events by entering data for the month, day of the month, day of the week, hours, minutes and seconds fields, 178–188, for a given tag. The event tag "startday" 190a sets the "startday" element in the real-time database 60 every day at 8:00 a.m. Similarly, "stopday" sets an element every day at 5:00 p.m. "Fri5pm" 190c, sets an element each Friday at 5:00 p.m. "Xmas" sets an element in the real-time database on December 25th of each year.

The Interval Timer Configuration Table 174, illustrated in FIG. 6b, provides for elements in the real-time database 60 which are set more than every twenty-four hours. Referring to FIG. 6b, the first interval tag "sec5" 200a represents an event which occurs every five seconds. Similarly, the interval tag "min1" 200b is set every minute; the "min5" interval tag 200c is set every five minutes; and, the "min20" internal tag is set every twenty minutes.

Referring now to FIGS. 2 and 7, the communications task 72 is illustrated. The communication task 72 links the real-time database 60 to equipment such as PLCs, data acquisition systems, material handling equipment, bar code scanners, automatic test equipment, scientific instruments, process control equipment and computers. The communication task 72 uses bidirectional communication to poll multiple devices on a data highway or multidrop network. Block writing and reading routines are used to provide maximum transfer speed between the real-time database 60 and the outside devices. In the preferred embodiment, a communications co-processor 42 is employed to increase the speed of communication and to reduce the work performed by the CPU 40.

Configuration tables for a typical PLC are given in FIG. 7a–c. FIG. 7a illustrates a PLC Polled Read Control Information Table 202. The Polled Read Control Information Table 202 has a polled read number field 204 and a interval reference field 206. FIG. 7b illustrates a Polled Read Configuration Table 208 having a definition tag field 210, a PLC unit read number field 212, and a PLC memory address field 214. PLC read tags 215a–b illustrate elements of the real-time database 60 defined by the Communications Task 72. FIG. 7c illustrates a PLC Write Configuration Table 216 having a data element to reference tag 218, a PLC unit number field 220, a PLC memory address field 222. PLC write tags 224a–b illustrate elements referenced by the communications task 72.

The PLC Polled Read Control Information Table 208, illustrated in FIG. 7a, provides communications between the real-time database 60 and the PLC 20 (or a PLC network). Since the communications task 72 may be required to obtain some data more often than other, a polled read number is associated with each group of configurations tables 202, 208 and 216, in order to identify a specific communications routine. The interval reference tag 206 designates the element of the real-time database 60 which triggers a block-read command to the PLC to obtain the data specified in Polled Read Configuration Table 208. As described in conjunction with FIG. 6, "sec5" is a element defined in the Interval Timer Configuration Table 174, which is set every five seconds. Thus, data will be transferred from the PLC to the real-time database 60 every five seconds. By leaving the interval reference tag field 206 blank, the data can be continuously scanned, limited only by the speed of the communications task 72. Also, the interval reference tag field 206 may refer to an element which is not time related. For example, one Polled Read Configuration Table 208 could monitor the status of twenty different machines. Twenty other Polled Read Configuration Tables 208 might monitor detailed data from each of the twenty machines. The interval reference tag fields 206 corresponding to each of the twenty Polled Read Configuration Tables 208 might refer to an element related to the status of the machines, resulting in a detailed data transfer only when a fault occurred in the respective machine.

In FIG. 7b, the PLC Polled Read Configuration Table 208 is illustrated. The Polled Read Configuration Table 208 defines elements of the real-time database 60 and corresponding memory addresses in the network of PLCs. For instance, the first PLC read tag 215a defines a data element "temp" to be stored in the real-time database 60. The unit field 212 specifies which PLC on the PLC network is to be accessed, while the address field 214 specifies which memory location within the particular unit is be accessed. Thus, the first PLC read tag "temp" 215a corresponds to the memory address of "115" in the "15" unit of the PLC network. This location is operably connected to the output of the fluid temperature meter 18.

The PLC Write Configuration Table 216 is illustrated in FIG. 7c. The Write Configuration Table 216 specifies which data elements in the real-time database 60 are written to the PLC 20. As in the case of the Polled Read Configuration Table 208, the unit number and the memory location within the unit are specified. Thus, for example, in the first example 224a, "flow," an element defined by the math and logic functions task 64, is written to the "113" memory location in the "15" PLC unit. Similarly, "heat" is written to the "114" memory location address of the "15" PLC unit.

It should be noted that the configuration tables illustrated pertain only to PLCs' different configuration tables that can be designed to accommodate other existing equipment such as robots, numerical control machines, and scientific testing equipment.

In the operation of the illustrated embodiment, the communication task 72 would perform as follows. Each five seconds, the memory locations associated with fluid temperature 28, fluid level 30, flow failure 32, and heater failure 34 will be read from the PLC 20 to the real-time database 60. If any of the values have changed from the previous reading, the changed status bits associated with that data element will be set in order to notify other tasks of the new data value. The math and logic function task 64 monitors "level" and "tempf" to evaluate "temp" 146a, "flow" 146f and "heat" 146g. "Flow" and "heat" are referenced by the Write Configuration Table 216 of the communication task 72; thus, if the most recent values of "temp" or "level" result in new values for "flow" 146f or "heat" 146g, the new values of "flow" and "heat" will be transferred from the real-time database 60 to the corresponding memory location, 36 or 38, in the PLC 20 and the changed status bits associated with "flow" or "heat" will be set. Consequently, the communications task 72 will read the new values, and the valve 22 or heater 26 will be turned on or off as appropriate.

Referring now to FIGS. 2 and 8, the operator input-/output task 66 is described. The operator input/output task 66 provides communications with the system operator. In the illustrated embodiment, the operator sends information to the real-time database 60 via the keyboard 54; however, other applications may utilize other input devices, such as bar code scanners, touch screens, push-button panels, track balls, "mice", or other user defined inputs. Data from the real-time database 60 is communicated to the operator in the illustrated embodiment through a color-graphics display and a printer; other output devices such as plotters, annunciators, and monochrome displays also are supported.

Figures 8A, 8B:
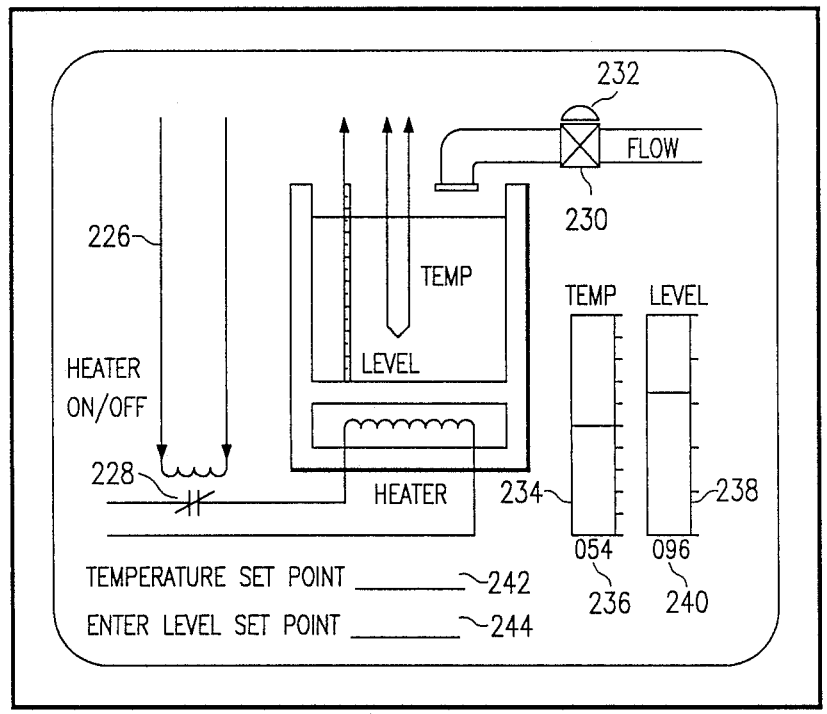

For most applications, a color-graphics display provides the most comprehensive interface between the operator and the real-time database 60. FIG. 8a illustrates a color-graphics display applicable to the illustrated embodiment. The basic outline of the display can be made using a graphic editor similar to those known in the art. An animation editor allows creation of objects, messages and values that change in color or shape and move in response to changes occurring to data in the real-time database. In the illustrated embodiment, the animated objects are the heater on/off object 226, the heater failure object 228, the valve on/off object 230, the valve failure object 232, the temperature bar graph 234, the temperature numeric reading 236, the level bar 238 and the level numeric reading 240. Also, two fields are available for operator input; the temperature set point input 242 and the level set point input 244.

In operation, the animation editor defines objects which can be linked to data elements in the real-time database 60 in order to create a screen which clearly presents relevant information. Furthermore, fields can be created to accept input from the operator for transfer to the real-time database 60.

Animation allows objects to change in color in response to a change in the value of an element of the real-time database 60. For example, the heater on/off object may appear as red when the heater 26 is on, and appear as black when the heater 26 is off. Similarly, the value on/off object 230 may appear as green when the valve is open, and as red when the valve is closed. The heater failure object 228 and the valve failure object 232 could be designed to change to flashing red to show a failure in respective equipment.

Dynamic bar graphic objects can be used to translate data into physical representations. For example, the temperature bar graph object 234, and the level bar graph object 238 are used to display the output of the fluid level meter 16 and the fluid temperature meter 18. Once the minimum and maximum values for the bar are determined by the user, the animation editor can compute the height of the bar graph from the value of the linked data element. The user may specify the foreground and background colors for the bar graph, and specify "limit" conditions at which the bar will change colors. For example, in the illustrated embodiment, it may be desirable to have a warning limit on the temperature bar graph object of 55° C. at which point the bar graph will change color from yellow to red. The animation editor can also display messages and numeric values. For example, a temperature numeric object 236 and a level numeric object 240 are associated with the respective bar graph objects 234 and 238. Aside from numeric messages, the animation editor may provide for the display of messages, such as the most recent alarm banner message, as previously explained in conjunction with the alarm supervisor 62.

The operator input/output task 66 also provides for operator input fields identified on the color-display monitor 52. The user may establish minimum and maximum values, so that an operator cannot inadvertently enter values too large or too small. The data input by the operator is transferred by the operator input/output task 66 to the real-time database 60. In the illustrated embodiment, there are two fields provided by operator entry: a temperature set point field 242, and a level set point field 244. In this embodiment, the operator would enter a desired value through the keyboard 54. It is also possible to define areas within the display which update a database element when the operator points to the areas with an input device, such as a cursor, mouse, track ball, or touch screen. For example, in an embodiment using a touch screen, the operator could manually turn on the valve 22 by pointing to the object designating the valve on the touch screen. By touching the screen, the operator input/output task 72 would transfer a value to the real-time database 60, which in turn, would be accessed by the communication task 72. The communication task would transfer the element from the real-time database 60 to the PLC 20, which would turn on the valve.

FIG. 8b illustrates a Graphics Mode Display Configuration Table 246. Using the Graphics Mode Display Configuration Table 246, the user identifies elements of the real-time database 60 in a reference tag field 248 which correspond to objects created with the animation editor, which are listed in an objects field 250. Display reference tags 252a–j relate objects described in relation to FIG. 8a with elements of the real-time database 60. Since more than one graphics display screen may be used in conjunction with the control system 10, each graphics display screen is identified in the display name field 254.

The system programmer calls up the Graphics Mode Display Configuration Table 246 after creating dynamic objects using the animation editor. The objects created will be displayed in the objects field 250 of the Graphics Mode Display Configuration Table 246. The programmer enters the elements of the real-time database 60 which correspond to those objects in the reference tag field 24. For example, "paint1" refers to the heater on/off object 226 in FIG. 8a. This corresponds to the database element "heat" defined in the math and logical functions task 64. "Bar1" and "number1" correspond to the bar graphic temperature object 234 and the temperature numeric objection 236; they are associated with "temp", a database element defined in the math and logic functions task 64 which provides a value corresponding to the actual temperature of the fluid.

Figure 9A:
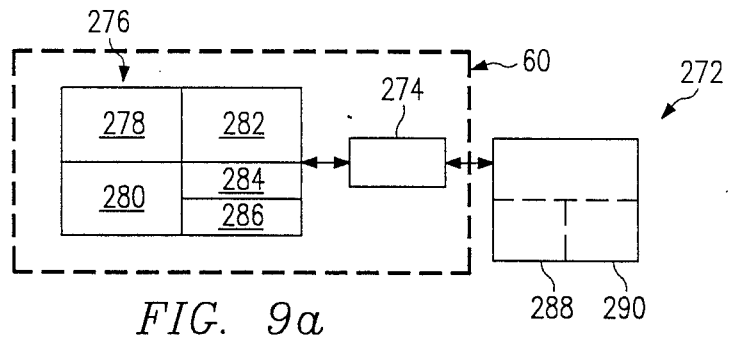
FIG. 9a illustrates communications between the real-time database and a task.
Figure 9B:
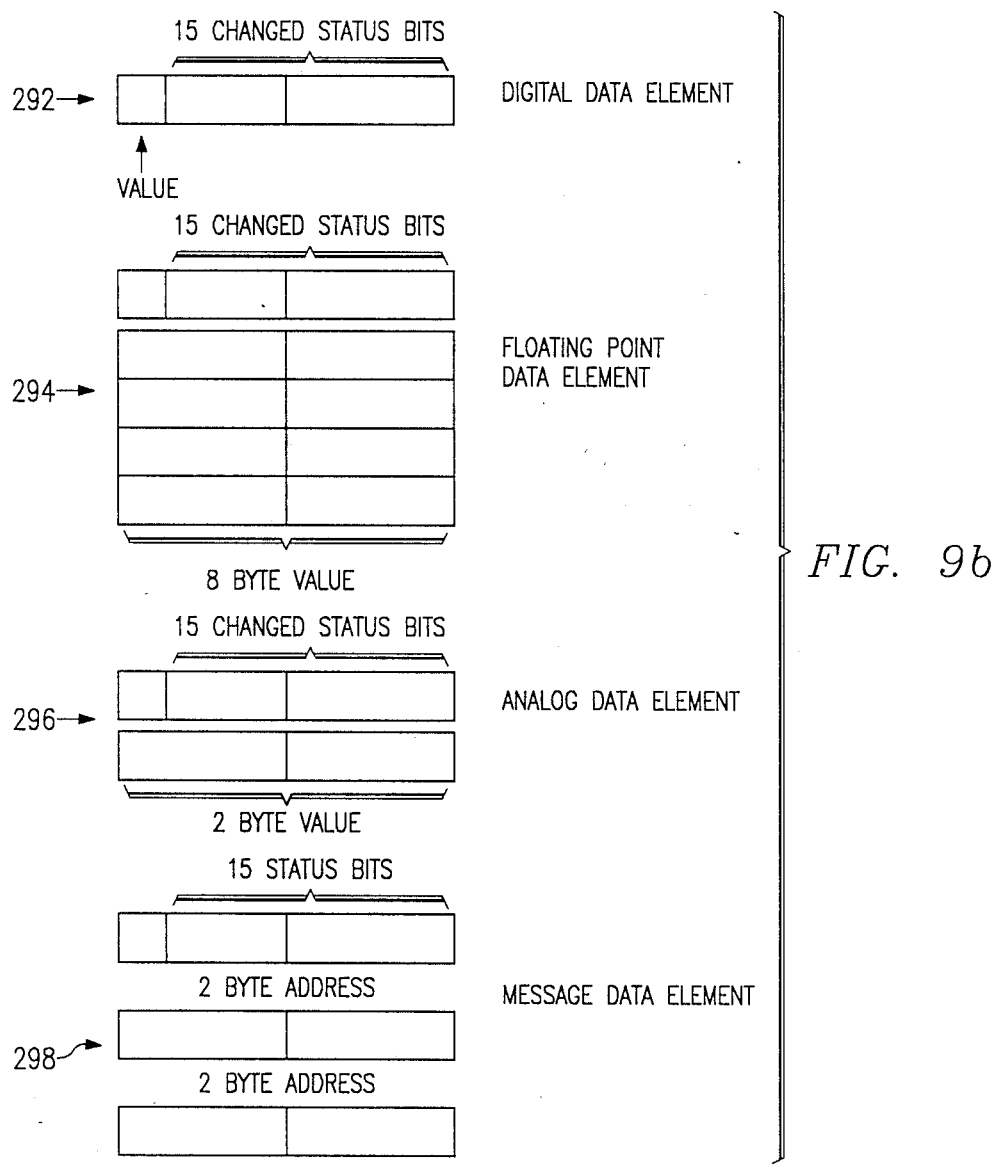
FIG. 9b illustrates memory allocation for elements of different data types.

FIG. 9 illustrates the communications between the real-time database 60 and a task 272, which may be one of the previously described tasks 62–72, or may be a user-supplied task. The real-time database 60 comprises a database manager 274 and a data storage memory array 276, with the database manager 274 having the ability to read to or write from the data storage memory array 276. The data storage memory array 276 is shown as partitioned into five blocks; a digital data type block 278, an analog data type block 280, a floating point data type block 282, a message data type block 284 and a message storage block 286. The task 272 maintains bidirectional communication with the real-time database 60 through the database manager 274. Two buffers are shown in the task 272; an "index" buffer 288 and a "value" buffer 290. FIG. 9b a digital data element 292, a floating point data point element 294, an analog data element 296 and a message data element 298.

In operation, communications between the task 272 and the real-time database 60 proceeds as follows. The data storage memory array 276 is partitioned into five areas: a digital data block 278, a analog data block 280, a floating point data block 282, a message data block 284 and a message storage data block 286. Each data block 278–284 comprises a plurality of data elements of specified type. Each "element" consists of a data "value" and the associated changed status bits. A digital data element 292 comprises two bytes, or 16 bits. The most significant bit of the first bytes is the "value" of the digital data element 292 (a digital data type has a value of "0" or "1"). The remaining 15 bits of the digital data element are changed status bits. Each task has an associated changed status bit; hence, up to 15 independent tasks can be supported. Since each digital data element comprises two bytes, the address of any one particular element, denoted by an index, can be quickly located by multiplying the index number by two and adding the result to the beginning address of the digital data block 278.

The floating point data element 294 comprises ten bytes. Fifteen bits of the first byte are used for changed status bits, with the most significant bit not used. The remaining eight bytes contain the value of the floating point data element. Since each floating point data element comprises ten bytes, the location of a particular floating point data element within the data storage memory array 276 can be determined by multiplying the index number by ten and adding that result to the starting address of the floating point data block 282.

An analog data element 296 comprises four bytes, with fifteen bits of the first two bytes used for the changed status bits. The remaining two bytes are used to contain the value of the analog data element. An analog data element can be located within the data storage memory array by adding the starting address of the analog data block 280 to the value of the index number times four.

A message data element 298 consists of six bytes, with fifteen bits of the first two bytes being used as the changed status bits. The third and fourth bytes of the message data element 298 contain an address located in the message storage block 286 which is the beginning address of the ASCII message. The fifth and sixth bytes hold the value indicating the number of bytes in the message. A particular message data element can be located within the data storage memory array 276 by multiplying the index by six and adding it to the address of the start of the message data block 284.

To communicate with the real-time database 60, the task 272 issues a command to the database manager 274. The command may be one of six primary commands: a "read command", a "write command", a "changed read" command, a "forced write" command, a "set" command, or a "clear" command. A "read" command can read one or more data elements from the data storage memory array 276, whether or not the changed status bits are set. A "write" command writes data to the data storage memory array 276, and sets all of the changed status bits if the value stored in the data storage memory array 276 actually changed as a result of the "write" command. A "changed read" command reads the value of a data element from the data storage memory array 276 if and only if the changed status bit associated with that task is set, indicating that the value has changed since the previous read command. Once the value has been read, the changed status bit for that task is cleared. A "forced write" command writes to the database and sets all of the changed status bits associated with the written elements, whether or not the value of the element changed as a result of the forced write. A "set" command sets the changed status bits associated with the issuing task for one or more elements in the data storage memory array 276. A "clear" command clears the changed status bits associated with the issuing task for one or more elements in the data storage memory array 276.

After issuing the command, the task 272 sends two pointers to the database manager 274: an index buffer pointer, and a value buffer pointer. The index buffer pointer indicates the beginning address of the task's index buffer at which the indexes of the data to be transferred are stored. Similarly, the value buffer pointer indicates the beginning address in the task's value buffer at which the values to be transferred are stored. The index buffer 288 contains a list of index numbers indicating the elements which should be transferred. The index indicates the data type (digital, floating point, analog or message) and an indexed number. The index number indicates the position of the data element within the particular block of the data storage memory array. For instance, "D(0)" would indicate the first element in the digital data block 278, "D(1)" would indicate the second element in the digital data block 278, and "A(0)" would indicate the first element in the analog data block 280. The action taken on the elements associated with the indexes stored in the index buffer 288 depends upon the issued command.

For instance, if the command was a "changed read", then the database manager 274 would sequentially read the changed status bit associated with the task 272 for each of the elements indicated by the indexes stored in the index buffer 288, starting at the address specified by the index buffer pointer. Upon finding a set changed status bit, the database manager would read the value of the element from the data storage memory array 276 and send the value of the element and the index of the element to the task. The task would then request that the database manager 274 continue to read the changed status bits of the remaining elements indicated by the index number stored in the index buffer 288; each time a set changed status bit was encountered, the index number and value of the changed element would be sent to the task. In the case of a "read" command, the value buffer 290 is disposed to receive a list of values of data referenced from the data storage memory array 276. On the other hand, in the case of a "write" or "forced write" command, the value buffer 290 is disposed to store the value of the elements which are to be written into the data storage memory array 276.

In an alternative embodiment, separate commands are associated with each data type; for example, the "changed read" commands would comprise "digital changed read", "analog changed read", "floating point changed read", and "message changed read" commands. Pursuant to this command structure, the list in the index buffer would be sorted by date type. By using data type specific commands, the actual data transfer between a task and the real-time database 60 can be simplified resulting in faster transfer rates.

Because of the unique communication between the task 272 and the real-time database 60, the processing speed of the entire control system 10 is increased. An important factor in increasing the processing speed, is the fast data transfers between the tasks and the real-time database 60. Other presently available database systems require a "look-up" table in order to match a index name with an address in the database. For instance, to obtain the value of "temp" a system using a look-up table would sort through an array having index names arranged in alphabetical order. Once a match was found, a corresponding array containing memory addresses would render the address of the value of "temp". As a result, much processing time is lost while the index name array is being searched for a match.

In comparison, the present invention supplies an index number for each index name while the system is "off-line", i.e., when the user fills in the configuration tables. As data types are defined for each task using the configuration tables, the system maintains a master list which assigns an index number to each index name. A separate list is kept for each data type. Tasks which reference, rather than define, elements in the real-time database 60 look-up the index number from the master list. However, this "look-up" is done during configuration, not during operation of the system. During operation, a data element can be accessed by a simple computation. Since there are only four data types, and since each data type has a set number of bytes allocated for each element within the data blocks 278-284, the address of the data element can be computed using two operations: multiplying the index number times the number of bytes allocated to each element, then adding the result of the multiplication to the beginning address of the data block. Hence, access speed is greatly increased.

Another factor increasing processing speed is the use of "changed read". First, a "changed read" reduces communications time between the task and the real-time database 60, since only values which have changed are transferred from the real-time database 60 to the local task memory. Thus, if a task references one hundred elements and, on the average, only two of the referenced elements change per scan, then on each scan, the changed read saves ninety-eight transfers. Second, since the task is informed which elements have changed, computations need not be repeated where the operands remain the same. Thus, the "changed read" saves both communication and computational time.

A third factor in increasing processing speed of the system 10, involves efficient collection of data from outside sources. For instance, several tasks may require data from the PLC 20. Rather than each task individually requesting data from the PLC 20, a single task may "blockread" data from the PLC into the real-time database 60; each task may access the needed data from the real-time database 60 rather than the PLC 20. Since data can be "block-read" only from a contiguous portion of the PLC's memory, transfer to the real-time database 60 before transferring the data to the individual task allows for faster data transfer. If each task needed to access the memory of the PLC 20 by requesting single addresses, communication time would be greatly increased for most applications.

Another advantage of the present invention is the ability to write new tasks for the system. Since inter-task communication must all take place through the real-time database 60, a new task can be added without concern for its effect on other tasks. Secondly, communication with the real-time database 60 is facilitated by the database manager 274 within the real-time database 60. In order to access the database, the new task need only issue a command and two pointers, along with appropriate lists of index numbers and values.

Furthermore, the present invention permits easy user configuration of the tasks, by use of "menus", as described in conjunction with FIGS. 3-8. The tasks can be configured off-line, and then run without reassembling the tasks.

The present invention provides advantages as discussed above, as well as numerous other advantages. As will be apparent to those skilled in the art, the present invention can be widely modified and varied. The scope of the invention is not limited, except as set forth in the accompanying claims.

What is claimed is:

1. A control system for controlling and monitoring electronically controlled equipment comprising:
control means including a plurality of programs each having associated local storage memory, each of said programs operable to be executed independently of other of said programs to produce output data;

a database memory comprising a plurality of memory elements for storing said output data; and database managing means operable to transfer data stored in one of said memory elements to one of said programs only if the data stored in said memory element has changed since a previous transfer to the local memory of said program of the data stored in said element.

2. The control system of claim 1 wherein said memory elements comprise a data portion and a plurality of status bits associated with said programs.

3. The control system of claim 2 wherein said database manager sets said status bits of one of said memory elements responsive to a change in said data portion of said one of said memory elements.

4. The control system of claim 3 wherein said database managing means clears one of said status bits associated with one of said programs in response to said data portion being transferred to said one of said programs.

5. The control system of claim 4 wherein said data managing means transfers said data portion of one of said to one of said programs when said status bit associated with said program is set and does not transfer said data portion to one of said program when said status bit is cleared.

6. The control system of claim 1 wherein said database memory comprises a plurality of memory blocks, each memory block associated with a particular data type.

7. The control system of claim 6 wherein each of said memory blocks comprises a plurality of memory elements, the memory elements of ones of said memory blocks being of equal size.

8. The control system of claim 7 wherein each of said output data has an associated index corresponding to a predetermined element in said database memory, said associated index identifying one of said memory blocks and the relative position of said predetermined element within said memory block.

9. The control system of claim 1 wherein said plurality of programs includes a communications program to provide data transfer between said database memory to the electronically controlled equipment.

10. The control system of claim 1 wherein said plurality of programs includes an output program for graphically displaying representations of the data stored in said data elements of said database memory.

11. A method for managing a database memory for monitoring and controlling electronically controlled equipment comprising the steps of:

receiving data from a plurality of programs independently of one another;

storing said data in associated memory elements in the database memory;

receiving requests from a program for a transfer of data stored in ones of said data elements to a second storage memory associated with the requesting program;

determining which of said requested data stored in said ones of said data elements have changed since a previous transfer of said data stored in said ones of said data elements to the requesting program; and transferring said data stored in said ones of said data elements which have changed since said previous transfer.

12. The method of claim 11 wherein said step of determining comprises the step of reading status bits associated with said ones of said memory elements and with said one of said programs, said status bits of a predetermined value indicating a change in said data element.

13. The method of claim 12 and further comprising changing said status bits in response to said received data being different than the previously data stored said associated memory elements to indicate that the data stored in memory element has changed.

14. The method of claim 12 and further comprising changing said status bits after transferring said data stored in ones of said data elements to an associated program to indicate that said data has been transferred.

15. The control system of claim 11 wherein said data has an associated index number and further comprising determining the address of said associated memory element by performing a mathematical address computation on said index number.

16. A control system for controlling and monitoring electronically controlled equipment comprising:

control means comprising a plurality of programs and associated local storage memory, each of said programs operable to be executed independently of other of said programs to produce output data having associated index numbers and data types;

a database memory for storing said output data in memory elements corresponding to said index numbers and said data types associated with said output data;

status bits associated with each memory element, such that each memory element has an associated status bit for each of said programs;

a processor for executing each of said programs to produce new output data;

database managing means for controlling the transfer of data between said database memory and said local storage memory, said database managing means adjusting the value of ones of said status bits to a first predetermined value upon changing the data stored in the data element associated with said ones of said status bits and to a second predetermined value upon transferring data to one of said programs associated with ones of said status bits; and said database manager operable to transfer data from one of said data elements to said local memory of one of said programs only when the status bit associated with both said one of said data elements and with said one of said programs has said first predetermined value.

* * * * *

UNITED STATES PATENT AND TRADEMARK OFFICE
CERTIFICATE OF CORRECTION

PATENT NO.  : 4,908,746

DATED       : March 13, 1990

INVENTOR(S) : Mitchell D. Vaughn

It is certified that error appears in the above-identified patent and that said Letters Patent is hereby corrected as shown below:

```
Column 3, line 12, after "30" insert --,--.
Column 7, line 46, after "screen" insert --.--.
Column 17, line 47, after "FIG 9b" insert --illustrates the
   format for the four different data types;--.
```

Signed and Sealed this

Twenty-third Day of July, 1991

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,908,746

DATED : March 13, 1990

INVENTOR(S) : Mitchell D. Vaughn

It is certified that error appears in the above-identified patent and that said Letters Patent is hereby corrected as shown below:

```
Column 1, line 6, change "a" to --an--.
Column 6, line 11, change "date" to --data--.
Column 7, line 10, change "a" to --an--.
Column 8, line 17, change "a" to --an--.
Column 9, line 52, change "a" to --an--.
Column 10, line 65, change "a" to --an--.
Column 13, line 39, change "a" to --an--.
Column 13, line 42, change "a" to --an-- first instance.
Column 14, line 2, change "internal" to --interval--.
Column 15, line 21, change "PLCs'" to --PLC--.
Column 15, line 21, after "PLC" add --and--.
Column 15, line 22, delete "that".
Column 19, line 41, change "date" to --data--.
Column 19, line 51, after "match" change "a" to --an--.
```

Signed and Sealed this

Twentieth Day of August, 1991

*Attest:*

HARRY F. MANBECK, JR.

*Attesting Officer*   *Commissioner of Patents and Trademarks*

(12) EX PARTE REEXAMINATION CERTIFICATE (7953rd)
United States Patent
Vaughn

(10) Number: US 4,908,746 C1
(45) Certificate Issued: Jan. 4, 2011

(54) INDUSTRIAL CONTROL SYSTEM

(75) Inventor: Mitchell D. Vaughn, Garland, TX (US)

(73) Assignee: United States Data Corporation, Richardson, TX (US)

Reexamination Request:
No. 90/010,033, Nov. 15, 2007

Reexamination Certificate for:
Patent No.: 4,908,746
Issued: Mar. 13, 1990
Appl. No.: 06/919,060
Filed: Oct. 15, 1986

Certificate of Correction issued Jul. 23, 1991.

Certificate of Correction issued Aug. 20, 1991.

(51) Int. Cl.
*G05B 23/02* (2006.01)

(52) U.S. Cl. .......................................................... 700/18
(58) Field of Classification Search ....................... 700/18
See application file for complete search history.

(56) References Cited

U.S. PATENT DOCUMENTS

| | | |
|---|---|---|
| 3,643,225 A | 2/1972 | Rice et al. |
| 4,747,060 A | 5/1988 | Sears, III et al. |

FOREIGN PATENT DOCUMENTS

| | | |
|---|---|---|
| JP | 59127444 | 7/1984 |
| JP | 61135255 | 6/1986 |

OTHER PUBLICATIONS

CopyRight Basics, <http://www.copyright.gov/circs/circ01.pdf>, 1976 Copyright Act.*
An English language translation of Japanese Patent No. JP 59-127444 (13 pages).
An English language translation of Japanese Patent No. JP 61-135255 (9 pages).

* cited by examiner

*Primary Examiner*—Majid Banankhah

(57) ABSTRACT

A control system (10) controls transfer of electronic signals to and from industrial and scientific equipment. The control system includes a real-time database (60) for storing data elements which may be accessed by a plurality of tasks (62, 64, 66, 68, 70, and 72). Each data element in the real-time database (60) has an associated changed status flag for each task which indicates whether the value of the element has changed since the last access by the task. Individual tasks must communicate through the real-time database, since no inter-task communication is supported. The tasks support bidirectional communication with industrial and scientific equipment, alarm supervision, data logging, real-time clock functions, mathematical and logical functions, and interactive operator communications.

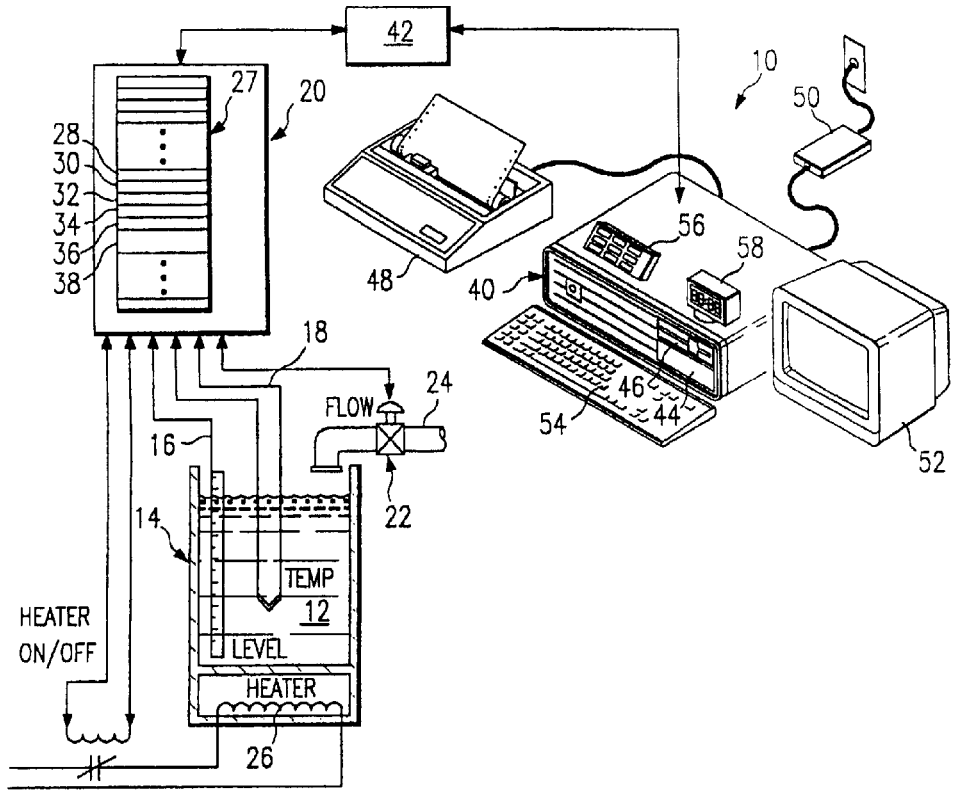

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *